United States Patent
Maier, Jr.

(10) Patent No.: US 6,895,890 B1
(45) Date of Patent: May 24, 2005

(54) FLEXIBLE MILK HOSE FOR AN AUTOMATIC MILKING PLANT

(76) Inventor: Jakob Maier, Jr., Griesstrasse 4, D-86842 Tuerkheim (DE)

( * ) Notice: Subject to any disclaimer, the term of this patent is extended or adjusted under 35 U.S.C. 154(b) by 0 days.

(21) Appl. No.: 10/031,864

(22) PCT Filed: May 11, 2000

(86) PCT No.: PCT/EP00/04281
§ 371 (c)(1),
(2), (4) Date: Jun. 5, 2002

(87) PCT Pub. No.: WO00/69252
PCT Pub. Date: Nov. 23, 2000

(30) Foreign Application Priority Data
May 12, 1999  (DE) .......................................... 199 22 131

(51) Int. Cl.$^7$ ................................................ A01J 5/00
(52) U.S. Cl. .................................... 119/14.47; 138/121
(58) Field of Search ....................... 119/14.47, 14.49, 119/14.01, 14.51; 138/109, 121

(56) References Cited

U.S. PATENT DOCUMENTS

| | | | | |
|---|---|---|---|---|
| 1,301,992 A | * | 4/1919 | Anderson ................ | 119/14.54 |
| 1,329,452 A | * | 2/1920 | Babson et al. ........... | 119/14.25 |
| 2,099,884 A | * | 11/1937 | Green ..................... | 119/14.51 |
| 2,172,612 A | * | 9/1939 | Hassenkamm .............. | 285/300 |
| 2,600,169 A | * | 6/1952 | Lamb ........................ | 333/241 |
| 3,079,891 A | * | 3/1963 | Miller ..................... | 119/14.13 |
| 3,549,176 A | * | 12/1970 | Contreras .................... | 285/55 |
| 3,726,252 A | * | 4/1973 | Needham et al. ........ | 119/14.08 |
| 3,858,615 A | * | 1/1975 | Weigl ......................... | 138/121 |
| 3,999,516 A | | 12/1976 | Shulick | |
| 4,263,875 A | | 4/1981 | Maier et al. | |
| 4,324,201 A | | 4/1982 | Larson | |
| 4,653,542 A | * | 3/1987 | Tascher ...................... | 138/109 |
| 4,745,881 A | * | 5/1988 | Larson .................... | 119/14.51 |
| 4,832,681 A | * | 5/1989 | Lenck ......................... | 600/34 |
| 5,125,909 A | * | 6/1992 | Heimberger ................ | 604/264 |
| 5,752,462 A | | 5/1998 | Petersson ................. | 119/14.47 |
| 6,755,153 B1 | * | 6/2004 | Chowdhury ............. | 119/14.47 |

FOREIGN PATENT DOCUMENTS

| | | |
|---|---|---|
| AT | 251960 | 1/1967 |
| DE | 1214036 | 11/1966 |
| DE | 25 23 465 | 12/1976 |
| DE | 19711250 A1 | 6/1998 |
| GB | 2 145 915 | 4/1985 |

OTHER PUBLICATIONS

Office Action dated Mar. 25, 2000 from German Patent Office for German Application No. 19922131.6–23, and English language translation thereof (5 pages).

* cited by examiner

Primary Examiner—Teri P. Luu
Assistant Examiner—Jordan Lofdahl
(74) Attorney, Agent, or Firm—Flynn, Thiel, Boutell & Tanis, P.C.

(57) ABSTRACT

An automatic milking plant is provided with a short milk hose, which, due to spaced-apart elevations in its center piece, has sufficient mechanical stability vis-a-vis pressure differences as well as a high flexibility. The use of the short milk hose according to the present invention leads to a reduction of the mechanical strain on the udder and thus also reduces irritations of the animal to be milked.

16 Claims, 5 Drawing Sheets

FLEXIBLE MILK HOSE FOR AN AUTOMATIC MILKING PLANT

FIELD OF THE INVENTION

The present invention relates to a milk hose for establishing a fluid connection, especially for connecting a teat cup to a multiway valve in an automatic milking plant.

BACKGROUND OF THE INVENTION

The increasing globalization of the agrarian markets necessitates an increasing degree of rationalization also in agricultural enterprises. Milk producing enterprises use therefore almost exclusively automatic milking plants. Hence, these plants have, on the one hand, the function of markedly increasing the milking capacity, i.e. they should be able to milk more animals per unit time, so as to increase the productivity of the agricultural enterprise, and, on the other hand, the physical and also the psychical strain to which the animals are subjected by the mechanical milking process should be reduced to a minimum by these plants.

An ideal milking plant should therefore be capable of processing during the milking operation a big flow of milk adapted to the standard of today's top cows, and, in so doing, it should simulate the natural sucking of a calf on its mother's udder. Only a milking process which simulates natural sucking will guarantee a complete evacuation of the udder and therefore a high yield of milk, the health of the teat and of the udder as well as mental well-being of the animal, which will also result in higher yields of milk in the long run. Any kind of treatment and any device which may cause the animal to feel uncomfortable should be avoided during the milking process. In particular the area of the milking plant which is in contact with the animal's teats directly or indirectly should be implemented such that the animal is not subjected to any irritation at all.

In the nowadays almost exclusively used milking plants the milk is extracted from the teat during the suction phase by means of a teat cup lined with a soft teat rubber. During this suction phase the teat cup dings to the teat only due to the operational vacuum prevailing in the plant. The extracted milk then flows through a connection hose, the so-called short milk hose, into a multiway valve, and from this multiway valve it is advanced into different line systems or collecting receptacles. During a second phase, the so-called relief phase, air at atmospheric pressure is introduced into the space between the teat rubber and the teat cup via a thin flexible hose so that the teat rubber will contract due to the negative pressure prevailing therein and interrupt the flow of milk from the teat to the outlet of the teat cup. In this phase, part of the teat rubber clings softly to the teat and the adherence of the teat cup to the teat is increased by the friction occurring between the teat and the teat rubber in addition to the still existing vacuum.

The change over from the suction phase to the relief phase takes place approx. 60 times per minute and leads to light shocks or vibrations due to the pressure fluctuations occurring during the change from one phase to the other and due to the change in the conditions under which the teat cup adheres to the teat. Due to the varying conditions under which the teat cup adheres to the teat, it is in Germany normally common practice to operate the milking plant in an alternating two-phase mode, i.e. two teat cups are in the suction phase, whereas the other two are in the relief phase. The teat cups are mechanically coupled to the multiway valve essentially via the four short milk hoses and, consequently, they are also mechanically coupled to one another. Since the short milk hoses have to transfer the flow of milk as well as the operating vacuum, an interior diameter of approx. 9–11 mm proved to be advantageous in existing plants. In addition, the ordinance concerning milk production demands that foreign matter originating from lines or receptacles must not be transferred into the milk. Since the milk hoses are produced from plastic material so as to guarantee the highest possible flexibility, the requirements on a high mechanical stability on the one hand (the interior diameter of the milk hose must not undergo any substantial deformations at a negative pressure of approx. 0.5–0.7 bar so as to avoid a negative influence on the flow velocity of the flow of milk) and the chemical passivity of the hose material on the other hand (the use of certain additives causing a stability of the material in the case of small wall thicknesses is not allowed) lead to embodiments of the milk hose having a comparatively large wall thickness. This has the consequence that the originally desired flexibility of the short milk hoses is markedly restricted. Hence, a comparatively strong mechanical coupling exists between the four teat cups via the milk hoses and via the multiway valve, and this has the effect that a change in the external conditions at one teat will also affect all the other teat cups. The comparatively rigid connection between the individual teat cups has e.g. the effect that, due to the different degrees of evacuation of the udder quarters during the milking process, in the course of which one teat cup gradually moves upwards ("climbs") until the edge of its opening is stopped by the udder, the other teat cups will be affected as well. This leads to tensions at the udder and therefore to an irritation of the animal and it may cause a premature interruption of the flow of milk in the case of the udder quarters which have not yet been emptied.

In addition, the constant twisting and bending forces acting on the short milk hoses entail a high degree of wear of the short milk hoses and a resultant fracture of the material, in particular at the transition points to the connection necks leading to the teat cups and the directional valve, respectively.

It is therefore the object of the present invention to provide short milk hoses which fulfill the requirements mentioned at the beginning more effectively than the conventional milk hoses used.

According to the present invention this object is achieved in that a flexible milk hose is provided, which is characterized in that it comprises a centre piece having a higher flexibility than the two end portions, said higher flexibility increasing towards the middle of the centre piece.

The structural design of the centre piece of the milk hose permits, on the basis of the increase in elasticity in a defined area (centre piece) of the milk hose, an absorption of twisting and bending forces by elastic deformation, the end portions, especially the transitions to the connecting necks, having hardly any load applied thereto. This effect is supported especially by the flexibility of the milk hose which increases towards the centre, since the radius of curvature of the milk hose is larger in the vicinity of the end portions than in the area of the centre of the hose and since, consequently, the mechanical load applied to the end portions is not as large.

In accordance with an advantageous embodiment, the centre piece comprises spaced-apart reinforcement elements enclosing, at least partially, the circumference of a certain area of the centre piece. This kind of structure permits a wall thickness which is fundamentally smaller than the wall thickness that could be used for a milk hose having no reinforcement elements. The areas between the reinforcement elements have therefore a high elasticity, the stability vis-a-vis the pressure difference being guaranteed by the reinforcement elements. It will be suitable when the reinforcement elements consist, at least partially, of a material whose elasticity is lower than that of the material which has been used for producing an area between said spaced-apart reinforcement elements. A big difference in the elasticities of successive areas permits the creation of reinforcement elements having e.g. a high dimensional stability so that a larger distance can be used, and this will, in turn, lead to a higher elasticity of the intermediate space (material of high elasticity) and therefore of the whole centre piece.

In accordance with a further preferred embodiment, the reinforcement elements contain a metal or a plastic material whose hardness is greater than that of the hose. Minimum dimensions in combination with high strength can be achieved, when e.g. rings or clips consisting of metal or of a hard plastic material are integrated in the hose wall of the centre piece.

In accordance with a further advantageous embodiment, the distance between the reinforcement elements decreases from the middle of the centre piece towards the respective first and second end portions. By means of this arrangement a decrease in the flexibility of the milk hose from the middle towards the outside is achieved, whereby it is guaranteed that a curvature of the element will occur substantially in the middle of the hose.

According to a further preferred embodiment, the reinforcement elements are implemented as spaced-apart elevations enclosing the circumference of the centre piece at least partially. This structure of the reinforcement elements has the advantage that the reinforcement elements may perhaps be applied subsequently to a suitably shaped milk hose.

In accordance with an advantageous embodiment, the wall thickness in an elevation exceeds the wall thickness in an area in which no spaced-apart elevations exist. Due to the increased amount of material provided in the area of an elevation, the necessary mechanical stability vis-a-vis the pressure differences occurring is guaranteed, even if the effective wall thickness of the areas between two elevations on the outer edge of the curvature of the hose will be reduced when the centre piece is being bent. Hence, it is possible to produce the centre piece from a uniform material.

According to another preferred embodiment, the whole flexible milk hose is produced from a uniform material. The milk hoses can therefore be produced at a moderate price.

In accordance with a further advantageous embodiment of the present invention, the elevations and the areas between two respective neighbouring, spaced-apart elevations have substantially the same wall thickness. Due to this structural design, which is similar to that of a bellows, the milk hose is particularly flexible and it is especially also adapted to be stretched and compressed, respectively, in the longitudinal direction. By enlarging the wall thickness in this area, it is possible to achieve by means of said increased wall thickness, in spite of the bellows-like structural design, a good stability against deformations of the interior diameter caused by pressure fluctuations and to maintain simultaneously a high flexibility, especially in the longitudinal direction. In addition, this embodiment is particularly suitable for imitating the natural sucking of the calf on the teat of the brood animal on the basis of the compression and stretching taking place in the longitudinal direction of the centre piece of the flexible milk hose during the change-over from the suction phase to the relief phase. On the basis of this alternating stretching and compression of the milk hose, the pendulum motion of the milking unit produced by the pressure differences occurring during the change-over from one phase to the other will be intensified and the teats will additionally be stimulated and the muscles of the udder relaxed in the rhythm of the phase change, similar to the effect produced when a calf is sucking on the udder.

In accordance with a further preferred embodiment, the first and second end portions have each formed thereon a reinforcement element. This measure serves to achieve a higher bending stiffness especially in the connection area of the milk hose, whereby bending will substantially occur in the centre piece, as intended, when a mechanical load is applied to the milk hose. This will reduce the risk of tearing of the hose, especially at the transition from the connecting neck to the connection element.

It will be advantageous when the wall thickness of the reinforcement elements exceeds that of the residual area of the first and second end portions. It is thus possible to stiffen the end portions, even if the milk hose is produced from one uniform material.

In accordance with another preferred embodiment, the interior diameter of the centre piece does not vary in this area. In the case of this embodiment, the flow of the stream of milk will not be impaired by interaction with the inner surface, e.g. by the formation of vortices on indentations on said surface. Furthermore, the fluid connection element can be cleaned easily.

According to another preferred embodiment, the wall thickness of the centre piece decreases from the first and second end portion towards the middle of said centre piece.

This permits the milk hose to be produced in a simple way, since the outer surface can be implemented as a smooth surface. The minimum wall thickness in the central area is chosen such that a sufficient dimensional stability of the milk hose under vacuum is still guaranteed. The wall thickness of the centre piece preferably decreases continuously towards the middle. It is, however, also possible to provide a step-like profile of the wall thickness; in this case, the axial dimensions of each of the respective areas of different wall thicknesses can be identical or different.

In accordance with a further preferred embodiment, the wall thickness of the reinforcement elements is smaller in the area of the middle of the centre piece than the wall thickness of the reinforcement elements arranged in the boundary area of said centre piece.

According to another preferred embodiment the wall thickness of the reinforcement elements decreases continuously towards the middle of the centre piece.

In accordance with a further preferred embodiment, the wall thickness of the intermediate areas between two neighbouring reinforcement elements is smaller in the area of the middle of the centre piece than the wall thickness of the intermediate areas of the reinforcement elements arranged in the boundary area of said centre piece.

According to another preferred embodiment, the wall thickness of the intermediate areas decreases continuously towards the middle of said centre piece.

The present invention will now be explained and described in detail making reference to embodiments and the drawing enclosed, which refer to these embodiments and in which:

DETAILED DESCRIPTION

Figure 1:
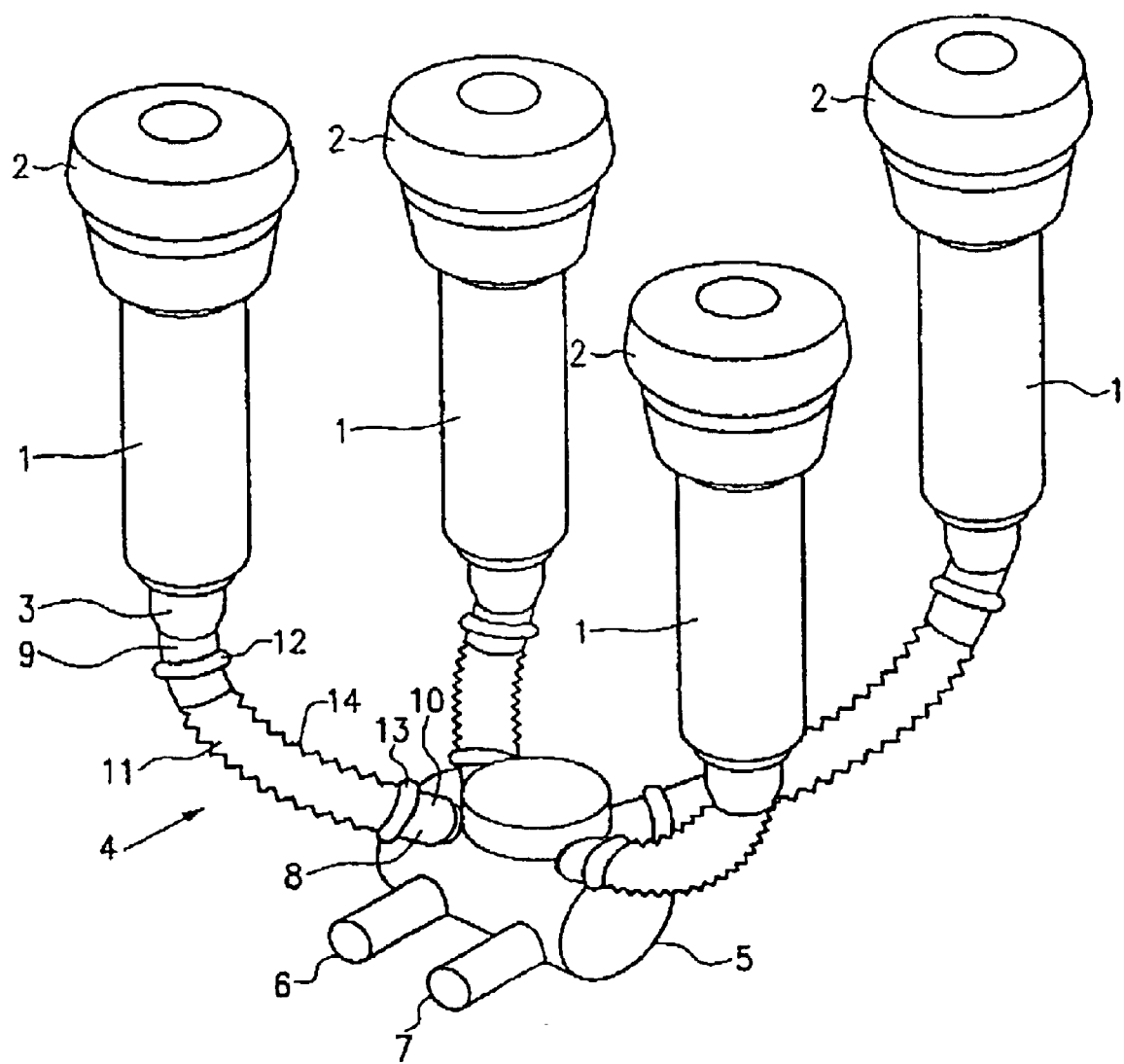
FIG. 1 shows a schematic, three-dimensional representation of a milking unit.
Figure 2:
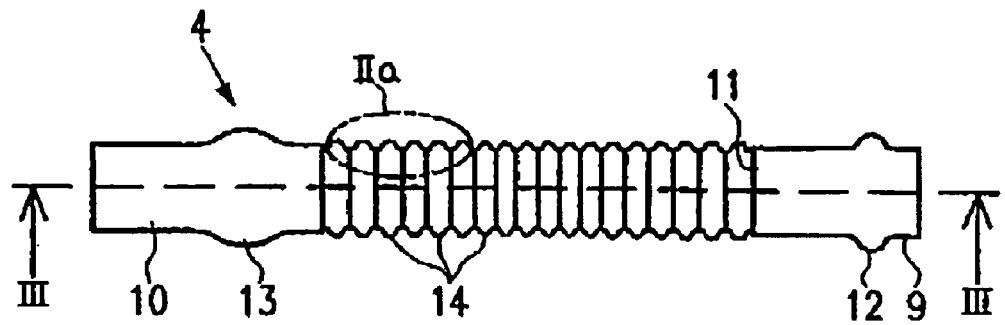
FIG. 2 shows a side view of one embodiment of the milk hose according to the present invention.
Figure 3:
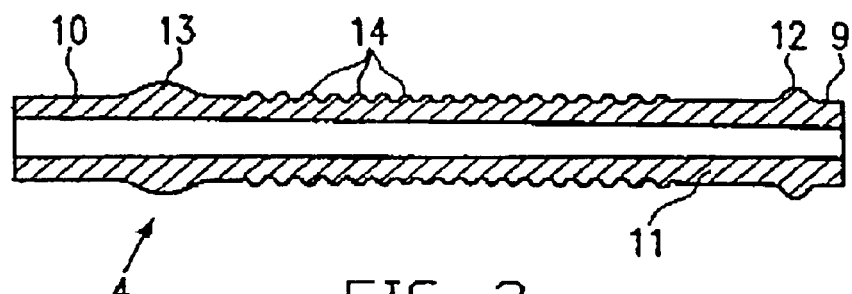
FIG. 3 shows a cross-section of the embodiment according to FIG. 1.

A first embodiment is now explained making reference to FIGS. 1, 2 and 3.

FIG. 1 shows the fundamental structural design of a milking unit in which short milk hoses are used in accordance with one embodiment of the present invention. Reference numeral 1 stands for the four teat cups at the upper edge of which the bulge of the teat rubber 2 is formed. The outlet neck 3 is arranged at the other end of the teat cup 1. The teat rubber 2 extends in the interior of the teat cup 1 down to the outlet neck 3. An inlet neck for the connection conduit by means of which fresh air is blown into the area between the teat cup 1 and the teat rubber 2 so as to change over from the suction phase to the relief phase is not shown in FIG. 1 for the sake of clarity. The outlet necks 3, which are formed on or attached to the teat rubbers, have short milk hoses 4 connected thereto. Instead of being separate parts, the teat rubber and the short milk hoses can also be implemented as an integral component (long teat rubber).

A multiway valve 5 with a milk inlet neck 8 and milk outlets 6 and 7 is connected to the teat cups 1 by means of said short milk hoses 4. The short milk hose 4 comprises a first end portion 9 which is pushed onto the connection neck 3 and a second end portion 10 which is pushed onto the connection neck 8, and a centre piece 11. The end portions 9 and 10 are each provided with beadlike, enlarged portions or reinforcement members 12 and 13, respectively, which increase the stiffness of this area. Kinking of the hoses, which often occurs in the connection areas, will be excluded in this way. The centre piece 11 of the short milk hose 4 is provided with spaced-apart annular elevations or reinforcement elements 14 along a certain area thereof.

Figure 2A:
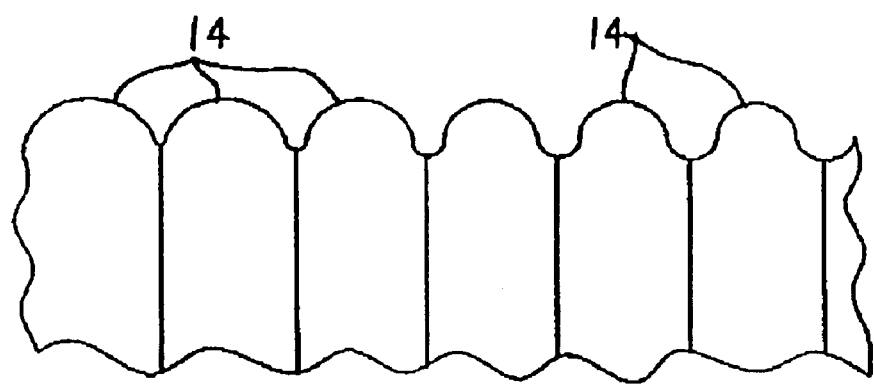
FIG. 2a shows an enlarged detail view of a portion of the milk hose of FIG. 2.

FIG. 2 shows a side view of the short milk hose 4 in accordance with the first embodiment of the present invention, and FIG. 2a is an enlarged detail view of a portion of the milk hose 4 shown in FIG. 2. In FIG. 2 identical parts are designated by the same reference numerals as in FIG. 1. It can be seen in FIGS. 2 and 2a that, in the case of this embodiment, the respective elevations 14 in the middle of the centre piece 11 have smaller axial dimensions than the elevations 14 at the end portions 10 and 9 of said centre piece. The density of the elevations, i.e. their number per unit length, remains preferably constant over the length of the centre piece 11. The elevations 14 of this embodiment as well as all the other components of the short milk hose 4 are produced from the same elastic material. It is, of course, possible to use different materials for the various areas The end portions 10 and 9 may, for example, consist of a mixture of materials including additives which make the material more stable, since these areas do not come into direct contact with the flow of milk. In addition, it is also imaginable to implement the elevations such that they have a uniform but smaller width, and to provide them with reinforcing rings or clips of a mechanically very stable material as a compensation. Metal rings or metal clips may e.g. guarantee a very high mechanical stability when used in combination with an elevation of minimum width.

FIG. 3 shows a short milk hose 4 in a cross-section along line 2—2 of FIG. 2. Identical parts have again been designated by Identical reference numerals according to FIGS. 1 and 2. The embodiment of the milk hose 4 shown in these figures has a smooth inner surface 15.

Figure 4:
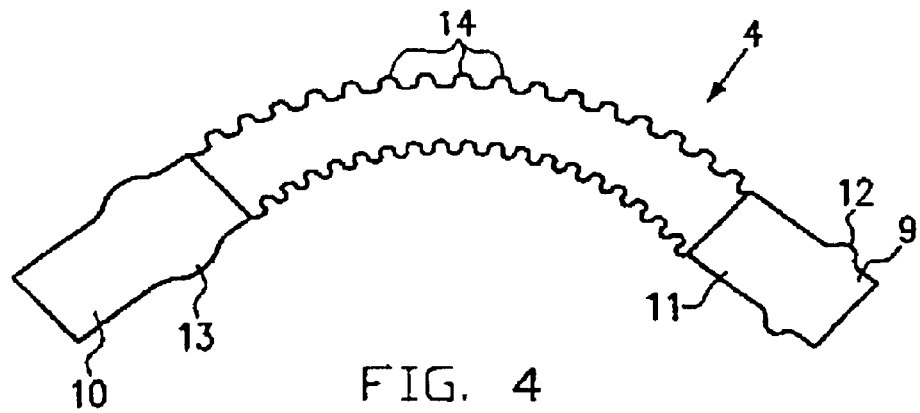
FIG. 4 shows a representation of the milk hose of the present invention in the bent condition of the hose.

FIG. 4 shows the embodiment according to FIGS. 1 to 3 in a side view, in a bent condition of the milk hose. In this representation, it can be seen that, when the short milk hose 4 is bent, the elevations 14 in the middle of the centre piece 11 will be stretched on the outer side of the curve, whereas the elevations 14 in the vicinity of the end portions 10 and 9 will almost maintain their axial dimensions. On the inner side of the curve, the elevations 14 located in the middle are, consequently, compressed more strongly than those located in the vicinity of the end portions. It follows that the milk hose 4 has in the middle of the centre piece a curvature which is larger than that in the vicinity of the end portions.

Figure 4A:
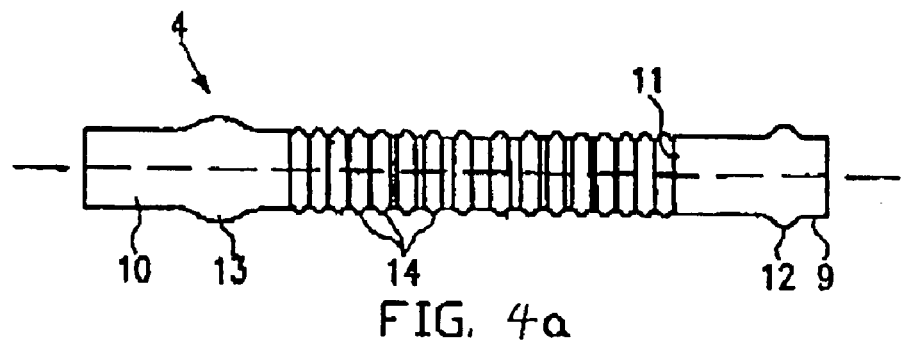
FIG. 4a shows a side view of a further embodiment of the invention.

FIG. 4a shows a further embodiment, wherein the distance between the reinforcement elements 14 decreases from a middle of the center piece 11 towards the end portions 12 and 13.

When the milking process is taking place and when the milking unit is being handled, the positions of the teat cups and, consequently, of the comparatively heavy directional valve will change to a greater or lesser degree due to mechanical influences and pressure fluctuations. On the basis of the improved elasticity of the short milk hose 4 according to the embodiments of the present invention, the respective teat cup can follow the movements, without these small changes in position being transferred to the directional valve and thus to the neighbouring teat cups to an extent which would be worth mentioning. It is advantageous when the area in which the short milk hose 4 has a particularly high flexibility is located in the middle and diminishes towards the sides. This has the effect that especially the mechanical forces acting on the short milk hose are substantially reduced in the areas of the connecting necks 3 and 8, whereby the risk of a fracture of material due to material fatigue will decrease essentially in this area. A further advantage in comparison with the short milk hoses according to the prior art is to be seen in the fact that the short milk hose according to the present invention has a certain flexibility also in the axial direction of the hose. This permits especially a compensation of changes in the position of the teat cup, which are caused during the milking operation due to the initially described "climbing" effect of the teat cup, i.e. the "climbing" of a teat cup on a teat which has already been emptied will not lead to any substantial change in position of the multiway valve, a possibly remaining minor change in position being, in turn, decoupled from the other teat cups due to the short milk hoses according to the present invention.

Figure 5:
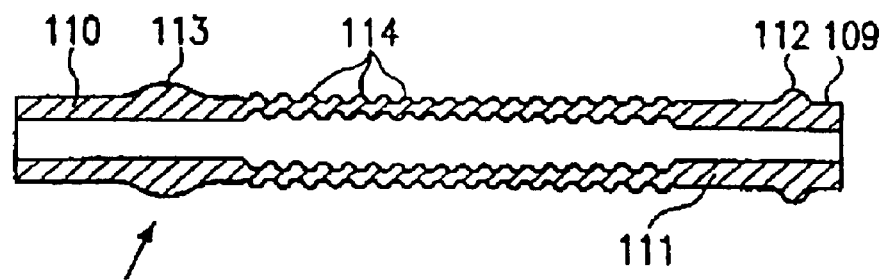
FIG. 5 shows a cross-section through a further embodiment of the milk hose of the present invention.

FIG. 5 shows a cross-section through a short milk hose according to a further embodiment of the present invention. A short milk hose 104 is provided with respective end portions 109 and 110. The end portions 109 and 110 have formed thereon beadlike enlarged portions 112 and 113, respectively. A centre piece 111 is provided with elevations 114 in a certain area thereof. Other than in the case of the preceding embodiments, the wall thicknesses of the elevations and of the areas between two respective neighbouring elevations are approximately equal. By means of this structural design, a particularly high flexibility is achieved. With the aid of this bellows-like structure of part of the centre piece 111 a high flexibility is advantageously achieved in the axial direction of the short milk hose. The effect of compensating the various heights of the teat cups during the milking operation is supported in this way. Furthermore, the high axial flexibility of the centre piece 111 can be utilized for producing a pendulum motion of the whole milking unit in the rhythm of the change-over from one phase to the other so as to achieve an additional stimulation of the teats and a relaxation of the udder muscles. The vacuum applied to the teats and therefore also to the short milk hose in the suction phase is higher than that applied in the relief phase. The character of this desired behaviour, which imitates the natural sucking of a calf, is, however, strongly dependent on the respective milking unit and its mode of operation. During the suction phase, a negative pressure is applied to the teat and, consequently, to the milk hose, said negative pressure imitating the suction behaviour of the calf to a greater or lesser degree depending on the respective plant. This negative pressure causes a contraction of the centre piece 111 in the suction phase, whereby the directional valve will be raised slightly. In the relief phase, however, the reduced negative pressure leads to an expansion of the centre piece 111 and thus to a lowering of the directional valve. This causes a pendulum motion of the directional valve and of the milk hoses, which leads to an additional stimulation of the teats and a relaxation of the udder muscles, and this will enhance the flow of milk. The effect of the pendulum motion of the milking unit caused by the increased axial flexibility of the centre pieces of the short milk hoses can be utilized in a particularly advantageous manner in connection with milking plants permitting a sufficient control of the negative pressure difference during the suction and relief phases, since particularly great changes in length will then take place. DE 2523465 describes e.g. a teat cup in the case of which a small, precisely defined amount of atmospheric air is blown into the area between the collapsing teat rubber enclosing the teat and the milk plug flowing off at the beginning of the relief phase, whereby the milk can flow off unhindered due to the reduced negative pressure above the milk plug. If no air were blown into this area, an area of higher negative pressure would be created above the milk plug which is just flowing off and, due to the suction effect, only part of the milk plug would flow off. Due to the additional amount of air, the milk can, however, flow off unhindered and a negative pressure, which is lower than the negative pressure prevailing during the suction phase, will build up also in the short milk hose so that a marked pressure difference will exist in the short milk hose during the two operating phases. The mechanical stimulation of the teats and the relaxation of the muscles of the udder leads to an increase in the flow of milk on the one hand and supports the health of the udder on the other, i.e. it also leads to an increase in the yield of milk in the long run. In order to increase the stability against changes of the interior diameter caused by the negative pressure in the interior of the hose, the average wall thickness in the area of the centre piece 111 having the bellows-like structure can e.g. be chosen such that it exceeds the wall thickness of the centre piece in the area in which no elevations are formed. In addition, it is also here imaginable that thin reinforcement rings or clips, which enclose only part of the circumference of the elevations, are attached to said elevations so as to achieve the necessary stability.

FIGS. 6a to 6d each show a cross-section through the central area of the centre piece of additional embodiments of the milk hose according to the present invention.

Figure 6A:
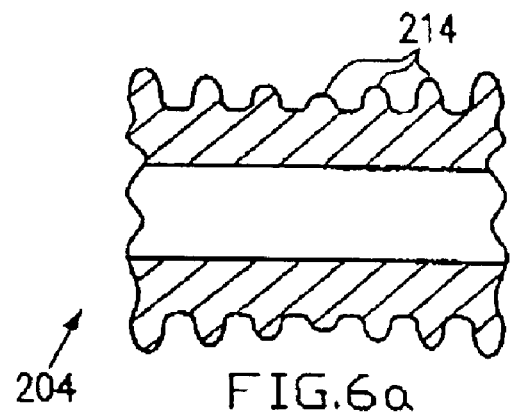
FIGS. 6a–6d each show a cross-section through the central area of the centre piece of the milk hose according to further preferred embodiments.

In FIG. 6a, a central area 204 of a flexible milk hose is provided with reinforcement elements 214. The reinforcement elements 214, which may be produced from the same material as the rest of the milk hose, have a wall thickness which decreases towards the middle, i.e. the additional layer of material of the reinforcement elements decreases in thickness towards the middle. In FIG. 6a, the central reinforcement element is represented as the element with the thinnest layer of material and the elements located further away from the middle have increasingly thicker layers of material and wall thicknesses. It is, however, also possible that one group comprises a plurality of reinforcement elements of identical wall thickness and that the centrally located group has the smallest wall thickness. It follows that the outer diameter of the milk hose decreases in size towards the middle due to the reduced wall thickness.

Figure 6B:
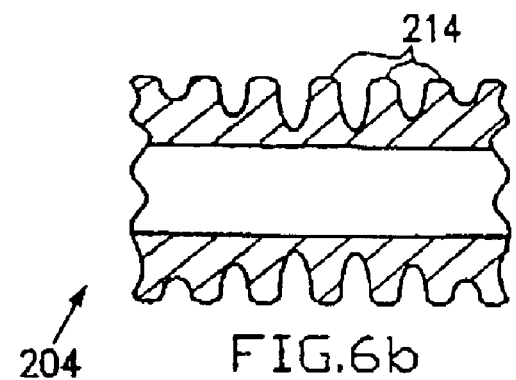

In FIG. 6b, the outer diameter remains approximately the same. The increase in flexibility towards the middle is achieved by the circumstance that the intermediate areas between the reinforcement elements 214 have increasingly smaller wall thicknesses.

Figure 6C:
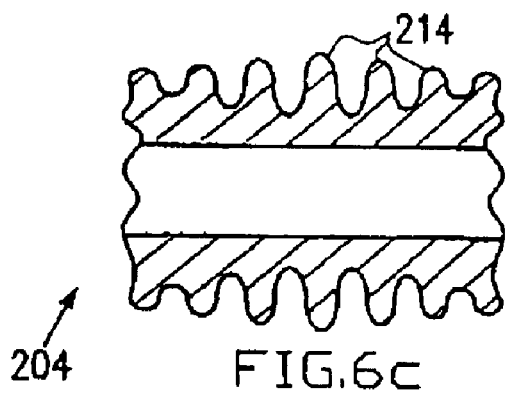

FIG. 6c shows an embodiment in the case of which the wall thickness of the intermediate areas decreases towards the middle, whereas the wall thickness of the reinforcement elements 214 slightly increases towards the middle so as to guarantee a better dimensional stability of the central area 204. The smaller wall thickness in the middle will, however, nevertheless guarantee an increase in flexibility towards the middle.

Figure 6D:
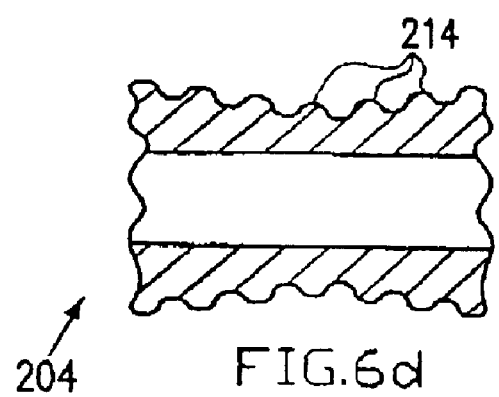

FIG. 6d shows an embodiment in the case of which the reinforcement elements 214 are implemented with identical wall thicknesses, said reinforcement elements being, however, arranged so to speak on a centre piece whose wall thickness decreases towards the middle centre. In certain circumstances, this may be advantageous in comparison with the embodiment shown in FIG. 6a, since the reinforcement elements in FIG. 6d are less sensitive to external mechanical loads, for example to being trodden on.

In accordance with a further embodiment, reinforcement elements are completely dispensed with and the wall thickness of the centre piece is reduced towards the middle. The wall thickness can be reduced continuously or in steps.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A flexible milk hose having a longitudinal axis and being made from a uniform material for connecting a teat cup to a multiway valve in an automatic milking plant, comprising:

a first end portion for connection to a connecting neck of the teat cup;

a second end portion for connection to a connecting neck of the multiway valve, and;

a centre piece disposed between and connecting said first and second end portions and having a substantially constant interior diameter, said centre piece including spaced-apart reinforcement elements which at least partially enclose a circumference of a predetermined area of the centre piece, the respective reinforcement elements disposed in a middle of the centre piece having smaller axial dimensions than the reinforcement elements located at the respective first and second end portions to provide the centre piece with a greater flexibility than said first and second end portions, said flexibility increasing towards the middle of the centre piece.

2. A flexible milk hose according to claim 1, wherein the reinforcement elements comprise spaced-apart elevations of material enclosing the circumference of the centre piece at least partially.

3. A flexible milk hose according to claim 2, wherein a wall thickness of each of said spaced-apart elevations of material exceeds a wall thickness of an area located between two adjacent spaced-apart elevations of material, the wall thicknesses being defined transversely relative to the longitudinal axis of the milk hose.

4. A flexible milk hose according to claim 1, wherein the first and second end portions each have formed thereon a reinforcement member, the reinforcement members being disposed on respective opposite sides of the centre piece, the reinforcement members each comprising an enlarged portion of material having a wall thickness which exceeds the wall thickness of the respective residual area of the corresponding end portion, the wall thicknesses of the reinforcement members and the residual areas being defined transversely relative to a longitudinal dimension of the milk hose.

5. A flexible milk hose according to claim 1, wherein the hose comprises a permanently chemically passive and stable material which will not give off secretions to the milk during the milking operation.

6. A milk hose for connecting a teat cup to a multiway valve in an automatic milking plant, said hose defining a longitudinal axis and comprising a first end portion configured for connection to a connecting neck of the teat cup, a second end portion configured for connection to a connecting neck of the multiway valve, and a centre piece disposed between and interconnecting said first and second end portions and having an interior diameter which is substantially constant, said centre piece including a plurality of axially spaced reinforcement elements which extend circumferentially along an exterior of said centre piece, the respective reinforcement elements in a middle of said centre piece having smaller axial dimensions than said reinforcement elements located at said first and second end portions to provide said centre piece with a greater flexibility than said first and second end portions, said flexibility increasing towards said middle of said centre piece.

7. A flexible milk hose according to claim 6, wherein the reinforcement elements are defined by spaced-apart elevations which enclose the circumference of the centre piece.

8. A flexible milk hose according to claim 7, wherein a wall thickness of each of said elevations exceeds a wall thickness in an area located between two adjacent elevations, the wall thicknesses being defined transversely relative to the longitudinal axis of the milk hose.

9. A flexible milk hose according to claim 6, wherein the first and second end portions each define thereon a reinforcement member, the reinforcement members being disposed on respective opposite sides of the centre piece and having wall thicknesses which exceed wall thicknesses of the respective first and second end portions, the wall thicknesses being defined transversely relative to the longitudinal axis of the milk hose.

10. A flexible milk hose according to claim 6, wherein the centre piece comprises a permanently chemically passive and stable material which will not give off secretions to the milk during the milking operation.

11. A flexible milk hose according to claim 6, wherein the milk hose is made of plastic.

12. A flexible milk hose according to claim 6, wherein the milk hose is adapted to be stretched and compressed in the longitudinal direction.

13. A flexible milk hose according to claim 1, wherein the milk hose is made of plastic.

14. A flexible milk hose according to claim 1, wherein the milk hose is adapted to be stretched and compressed in the longitudinal direction.

15. A flexible milk hose according to claim 4 wherein the reinforcement elements are distributed along substantially the entire longitudinal extent of the centre piece as defined between the respective reinforcement members.

16. A flexible milk hose according to claim 9 wherein the reinforcement elements are distributed along substantially the entire longitudinal extent of the centre piece as defined between the respective reinforcement members.

* * * * *